(12) United States Patent
Iwanaga

(10) Patent No.: US 7,458,436 B2
(45) Date of Patent: Dec. 2, 2008

(54) MOTORCYCLE

(75) Inventor: Sadamu Iwanaga, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 238 days.

(21) Appl. No.: 10/559,910

(22) PCT Filed: Jun. 28, 2004

(86) PCT No.: PCT/JP2004/009123

§ 371 (c)(1),
(2), (4) Date: Aug. 30, 2006

(87) PCT Pub. No.: WO2005/002953

PCT Pub. Date: Jan. 13, 2005

(65) Prior Publication Data

US 2007/0107968 A1 May 17, 2007

(30) Foreign Application Priority Data

Jul. 1, 2003 (JP) ............................. 2003-189209
Jun. 2, 2004 (JP) ............................. 2004-164252

(51) Int. Cl.
*B62M 7/00* (2006.01)
(52) U.S. Cl. ..................... 180/227; 70/233; 180/219; 280/288.4
(58) Field of Classification Search .............. 70/233; 180/227; 280/288.4
See application file for complete search history.

(56) References Cited

U.S. PATENT DOCUMENTS

| 4,436,232 | A | * | 3/1984 | Zane et al. ................. 224/462 |
| 5,560,445 | A | * | 10/1996 | Saito et al. ................. 180/219 |
| 5,671,622 | A | | 9/1997 | Yamada et al. |
| 6,170,593 | B1 | * | 1/2001 | Hatanaka ..................... 180/219 |
| 6,588,529 | B2 | * | 7/2003 | Ishii et al. ................... 180/219 |
| 6,860,359 | B2 | * | 3/2005 | Tanabe et al. ............... 180/309 |
| 6,889,789 | B2 | * | 5/2005 | Kurayoshi et al. .......... 180/219 |
| 7,428,833 | | * | 9/2008 | Tollefson ....................... 70/49 |

FOREIGN PATENT DOCUMENTS

| EP | 0 726 196 A1 | | 8/1996 |
| EP | 1640256 A1 | * | 3/2006 |
| JP | 07-329847 | | 12/1995 |
| JP | 08-207849 | | 8/1996 |
| JP | 09-58548 | | 3/1997 |
| JP | 2002-29474 | | 1/2002 |
| WO | WO 2005002953 A1 | * | 1/2005 |

* cited by examiner

*Primary Examiner*—Lynda Jasmin
*Assistant Examiner*—Patrick Centolanzi
(74) *Attorney, Agent, or Firm*—Keating & Bennett, LLP

(57) ABSTRACT

A motorcycle includes a rear arm, at one end of which a rear wheel is axially supported and the other end of which is pivotally supported by a body frame via a pivotally supporting shaft. A spring unit is interposed between the rear arm and the body frame so as to be located between the pivotally supporting shaft and the rear wheel. A lock arm placing section houses a lock arm for theft prevention having left and right arm sections and a bent section coupling ends of the left and right arm sections to each other. The lock arm placing section houses the lock arm in a position in which the left and right arm sections of the lock arm are located on both sides of the spring unit.

13 Claims, 11 Drawing Sheets

MOTORCYCLE

BACKGROUND OF THE INVENTION

1. Field of the Invention

The present invention relates to a motorcycle, and more particularly to a housing structure for a lock arm for theft prevention.

2. Description of the Related Art

In a motorcycle, from the viewpoint of realizing theft prevention when the motorcycle is parked, a locking device for locking a wheel is often provided in a body frame. As a locking device of this type, for example, a locking device including a U-shaped lock arm and a lock body, which closes a space between tips of the lock arm, is generally used.

When such a locking device is housed in a vehicle body, it is desirable to house the locking device below a seat that is openable and closable by a key. Therefore, there is proposed a motorcycle in which the locking device is housed, for example, on an upper surface of a rear fender below the seat or housed between left and right seat rails below the seat (see, for example, patent documents JP-A-7-329847 and JP-A-9-58548).

However, when the locking device is simply arranged below the seat as described above, there is a concern that, depending on an arrangement position thereof, a seat height is increased to reduce a feet placing property (i.e., the ability of a rider to comfortably place his or her feet on the pegs of the motorcycle) or the thickness of a seat cushion is reduced deteriorating seating comfort.

It is conceivable to reliably achieve both a desirable feet placing property and seating comfort by housing the locking device in a position as low as possible below the seat. However, if the locking device is arranged in a low position below the seat, since the locking device tends to interfere with components of the vehicle body such as a rear spring unit, eventually, it is difficult to secure a housing space for the locking device.

SUMMARY OF THE INVENTION

In order to overcome the problems described above, preferred embodiments of the present invention provide a motorcycle that can realize both the desired feet placing property and seating comfort and secure a housing space for the locking device without interfering with components of a vehicle body in housing the locking device below the seat.

A preferred embodiment of the present invention includes a rear arm, at one end of which a rear wheel is axially supported and the other end of which is pivotally supported by a body frame via a pivotally supporting shaft, a spring unit interposed between the rear arm and the body frame so as to be located between the pivotally supporting shaft and the rear wheel, and a lock arm placing section that houses a lock arm for theft prevention having left and right arm sections and a bent section coupling ends of the left and right arm sections to each other, and the lock arm placing section houses the lock arm in a position in which the left and right arm sections of the lock arm are located on both sides of the spring unit.

According to another preferred embodiment of the present invention, the lock arm placing section houses the lock arm in a position in which the left and right arm sections are located on both left and right sides in a vehicle width direction of the spring unit and extend in a front-to-rear direction of the vehicle.

According to another preferred embodiment of the present invention, the lock arm placing section houses the lock arm in a position in which the lock arm is slanted down and forward in the front-to-rear direction of the vehicle and one of the left and right arm sections is located in a position lower than the other.

According to another preferred embodiment of the present invention, a lock body, which fixes the lock arm in the lock arm placing section, is arranged between the spring unit and the bent section of the lock arm.

According to another preferred embodiment of the present invention, the lock arm placing section is provided on an upper surface of a mud guard disposed above the rear wheel.

According to another preferred embodiment of the present invention, the lock arm placing section is arranged between a muffler arranged on a lower side of a seat for a tandem rider and the spring unit.

According to another preferred embodiment of the present invention, a shielding section for shielding heat from the muffler is integral with the lock arm placing section.

According to another preferred embodiment of the present invention, the lock arm placing section is arranged below a cross member that couples left and right seat rails, which support a seat, each other and supports the spring unit.

Another preferred embodiment of the present invention includes a seat arranged above a rear wheel, a muffler of an exhaust system arranged between the seat and the rear wheel, and a lock arm placing section that houses a lock arm for theft prevention having left and right arm sections and a bent section coupling ends of the left and right arm sections to each other, and the lock arm placing section is arranged under the seat and near the front of the muffler.

Another preferred embodiment of the present invention includes an exhaust pipe, which leads to the muffler and is disposed in a vehicle width direction substantially parallel to the lock arm placing section, the exhaust pipe is displaced to one side in the vehicle width direction from a width direction center line of the vehicle in a section where the exhaust pipe and the lock arm placing sections are disposed substantially parallel in the vehicle width direction, and the lock arm placing section houses the lock arm in a position in which the center line in the vehicle width direction of the lock arm is displaced to the other side in the vehicle width direction from the center line of the vehicle.

According to another preferred embodiment of the present invention, a connecting section of the exhaust pipe and the muffler is displaced to one side in the vehicle width direction from the center line of the vehicle.

Another preferred embodiment of the present invention includes a pair of left and right seat rails supporting a seat, a lock arm placing section that houses a lock arm for theft prevention having left and right arm sections and a bent section coupling ends of the left and right arm sections to each other, and the seat rails have a first portion located near a front end of the seat and a second portion located further in the rear in a front-to-rear direction of the vehicle than the first portion and having a vehicle width direction interval larger than that of the first portion, and the lock arm placing section houses the lock arm in a position in which the left and right arm sections of the lock arm extend upward to the rear in the front-to-rear direction of the vehicle in a position in which the left and right arm sections are arranged in the vehicle width direction, the bent section is located in the rear in the front-to-rear direction of the vehicle, one arm section passes below a space between the first portion and the second portion of the seat rails in a plan view, and a tip of the one arm section is located further on an outer side from the first portion and further on an inner side from the second portion in the vehicle width direction.

According to another preferred embodiment of the present invention, the lock arm placing section slants and houses the lock arm such that the one arm section is located in a position lower than the other arm section.

According to another preferred embodiment of the present invention, the lock arm placing section houses the lock arm in a position in which the left and right arm sections are located on both sides of the spring unit. Thus, it is possible to house the lock arm in a low position below the seat without interfering with the spring unit. This makes it possible to house the lock arm without increasing a seat height or reducing the thickness of the seat cushion and secure both the feet placing property and the seating comfort.

According to another preferred embodiment of the present invention, the lock arm is housed in a position in which the left and right arm sections are located on the left and right sides in the vehicle width direction of the spring unit and extend in the front-to-rear direction of the vehicle. Thus, it is possible to compactly house the lock arm in a small space below the seat.

According to another preferred embodiment of the present invention, the lock arm is arranged to be slanted down and forward. Thus, it is possible to place and remove the lock arm easily while preventing interference with the rear wheel. In addition, one arm section is slanted to be located in a position lower than the other arm section. Thus, it is possible to reduce a housing dimension in the vehicle width direction of the lock arm.

According to another preferred embodiment of the present invention, the lock body is arranged between the spring unit and the bent section of the lock arm. Thus, it is possible to effectively house the lock body using a free space in the lock arm.

According to another preferred embodiment of the present invention, the lock arm placing section is arranged on the upper surface of the mud guard disposed above the rear wheel. Thus, it is possible to provide the lock arm placing section using the existing mud guard effectively and prevent an increase in the number of components compared with the case in which a placing section is provided separately.

According to another preferred embodiment of the present invention, the muffler is arranged on a lower side of the seat for a tandem rider and the lock arm placing section is arranged between the muffler and the spring unit. Thus, it is possible to secure a housing space housing the lock arm in a so-called up-muffler type vehicle. In addition, it is possible to avoid thermal damage from the muffler.

In addition, the lock arm and the muffler are arranged side by side lengthwise below the seat and never overlap each other. Thus, it is impossible that a seat height increases to deteriorate the feet placing property or the thickness of the seat cushion decreases to deteriorate the seating comfort. As a result, it is possible to reliably achieve both the desired feet placing property and the seating comfort.

According to another preferred embodiment of the present invention, the shielding section for shielding exhaust heat from the muffler is integral with the lock arm placing section. Thus, it is possible to surely avoid thermal damage from the muffler without increasing the number of components.

According to another preferred embodiment of the present invention, the lock arm placing section is arranged below the cross member that couples the left and right seat rails and supports the upper end of the spring unit. Thus, it is possible to arrange the lock arm placing section using a space, which is generated in order to support the upper end of the spring unit, effectively.

According to another preferred embodiment of the present invention, the lock arm and the muffler are arranged side by side lengthwise below the seat and never overlap each other. Thus, it is impossible that a seat height increases to deteriorate the feet placing property or the thickness of the seat cushion decreases to deteriorate the seating comfort. It is possible to realize both the feet placing property and the seating comfort. In addition, since the lock arm and the muffler are arranged side by side in a lengthwise direction, it is possible to secure space for the muffler without increasing a vehicle width. Moreover, the muffler is located behind the lock arm placing section. Thus, in a structure for exhausting exhaust gas, it is unnecessary to take into account interference with the lock arm placing section. Therefore, it is possible to simplify the structure for exhausting exhaust gas while adopting the structure in which the lock arm and the muffler are arranged side by side lengthwise.

According to another preferred embodiment of the present invention, the exhaust pipe is displaced to one side of the vehicle body center line and the lock arm placing section displaces the lock arm to the other side and house the lock arm. Thus, it is possible to house the lock arm below the seat without increasing a seat height or increasing a vehicle width.

According to another preferred embodiment of the present invention, the connecting section of the exhaust pipe and the muffler is displaced to one side of the width direction center line of the vehicle body. Thus, it is easy to secure a space for the lock arm placing section.

According to another preferred embodiment of the present invention, the lock arm is housed such that one arm section passes below a space between the first portion and the second portion of the seat rails in a plan view and a tip of the one arm section is located further on an outer side than the first portion and further on an inner side than the second portion in the vehicle width direction. Since the lock arm is housed in a low position below the seat rails in this way, it is possible to house the lock arm without increasing the width of the seat rails as well as a vehicle width and secure the desired feet placing property. In this case, although the lock arm is located further on the outer side in the vehicle width direction than the first portion of the seat rails, the feet placing property is affected less because the lock arm is housed in a low position.

According to another preferred embodiment of the present invention, it is possible to reduce a housing space because the lock arm is slanted in the vehicle width direction.

Other features, elements, characteristics, and advantages of the present invention will become more apparent from the following description of preferred embodiments of the present invention with reference to the attached drawings.

DETAILED DESCRIPTION OF PREFERRED EMBODIMENTS

Preferred embodiments of the present invention will be hereinafter explained on the basis of the attached drawings.

Figure 1:
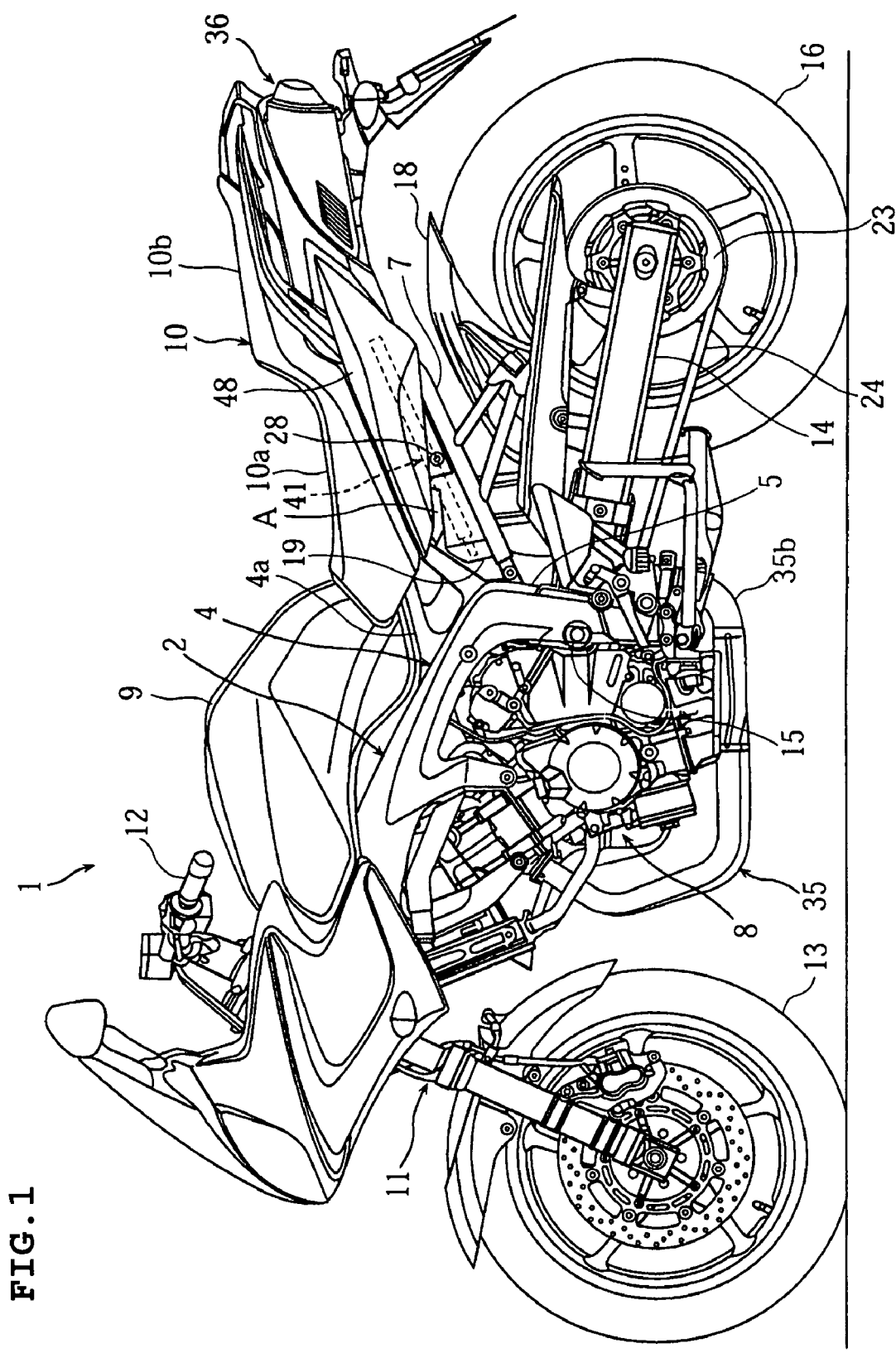
FIG. 1 is a side view of a motorcycle in which a locking device according to a preferred embodiment of the invention is disposed.
Figure 2:
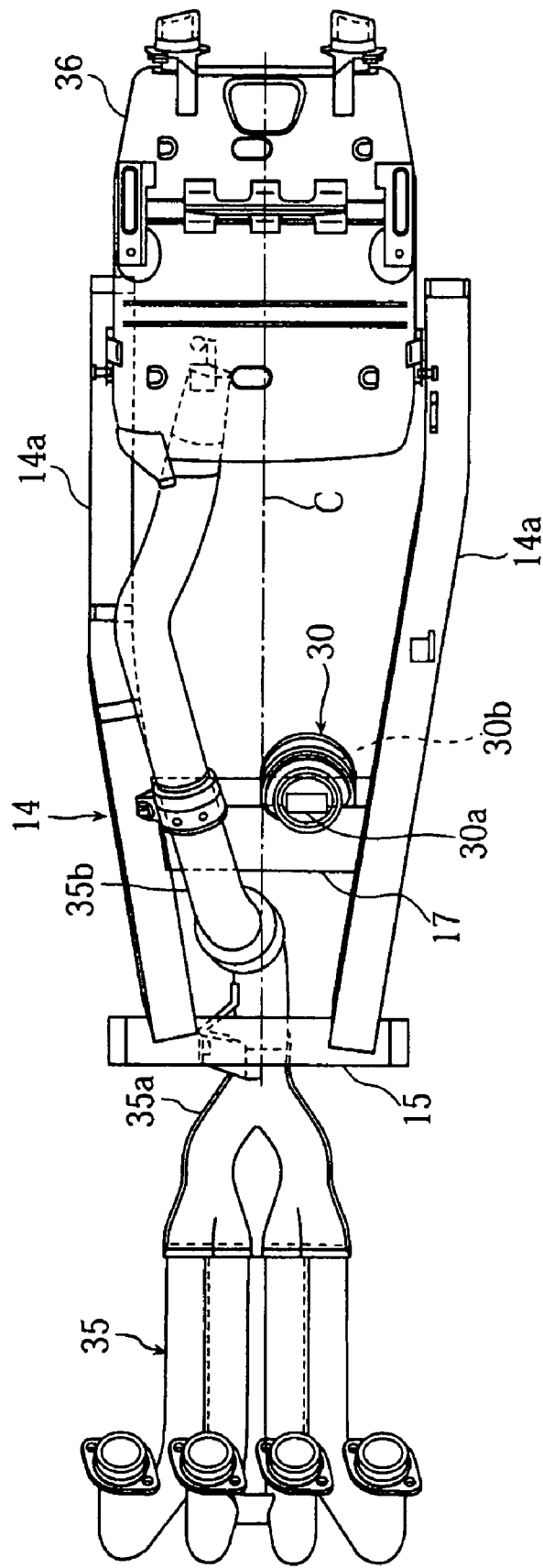
FIG. 2 is a plan view around a rear arm of the motorcycle.
Figure 3:
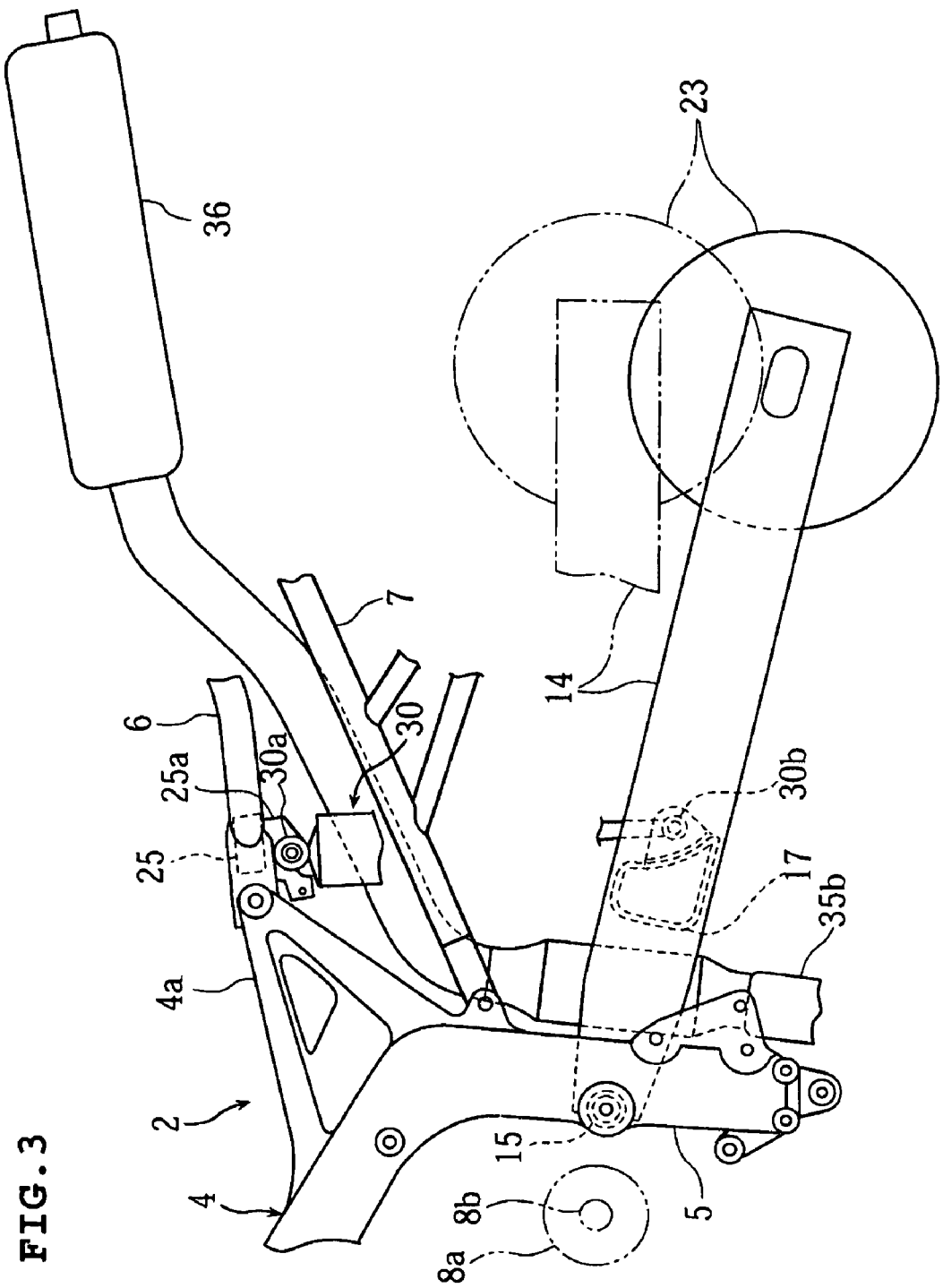
FIG. 3 is a side view around the rear arm.
Figure 4:
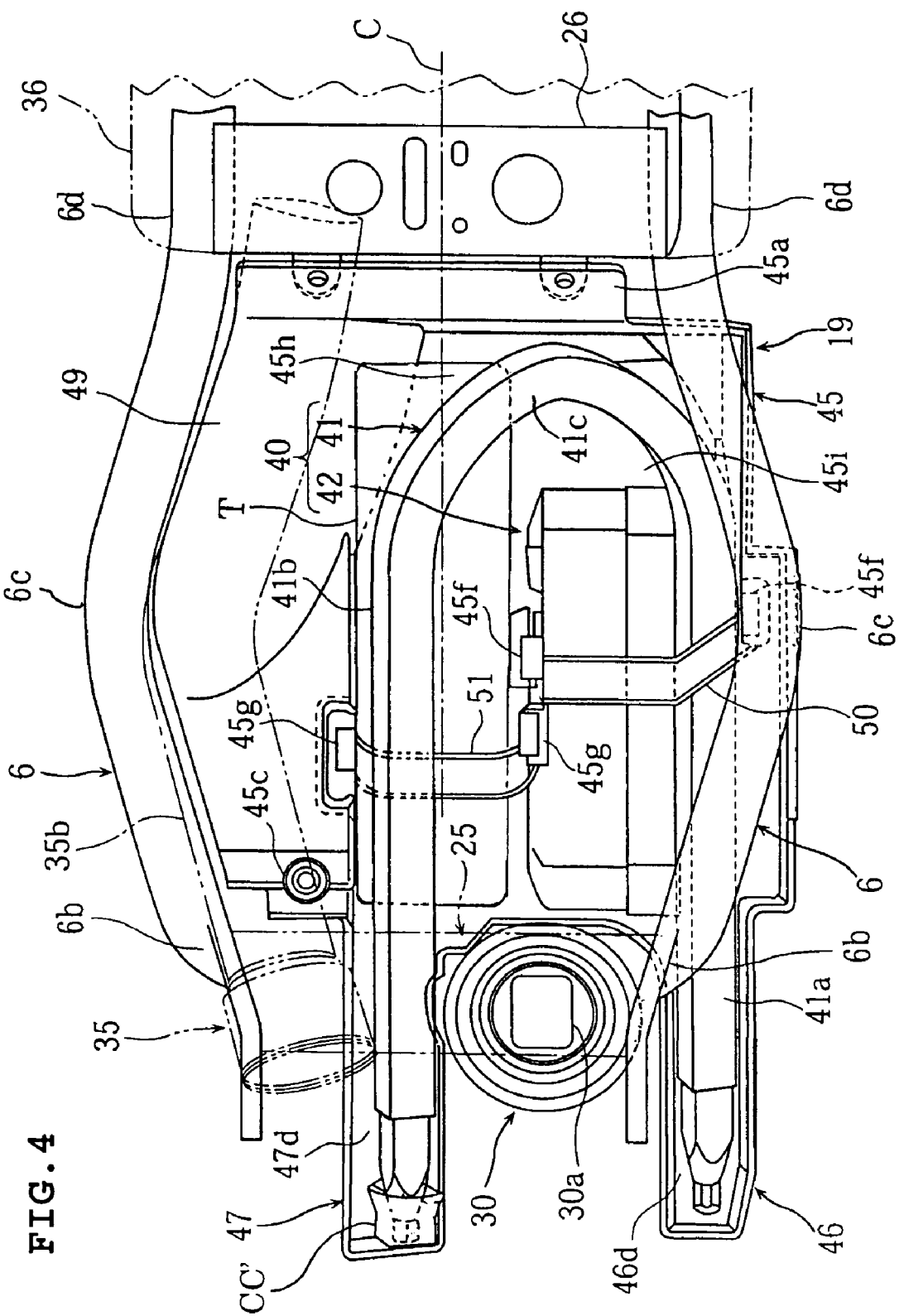
FIG. 4 is a plan view of a housing structure for the locking device.
Figure 5:
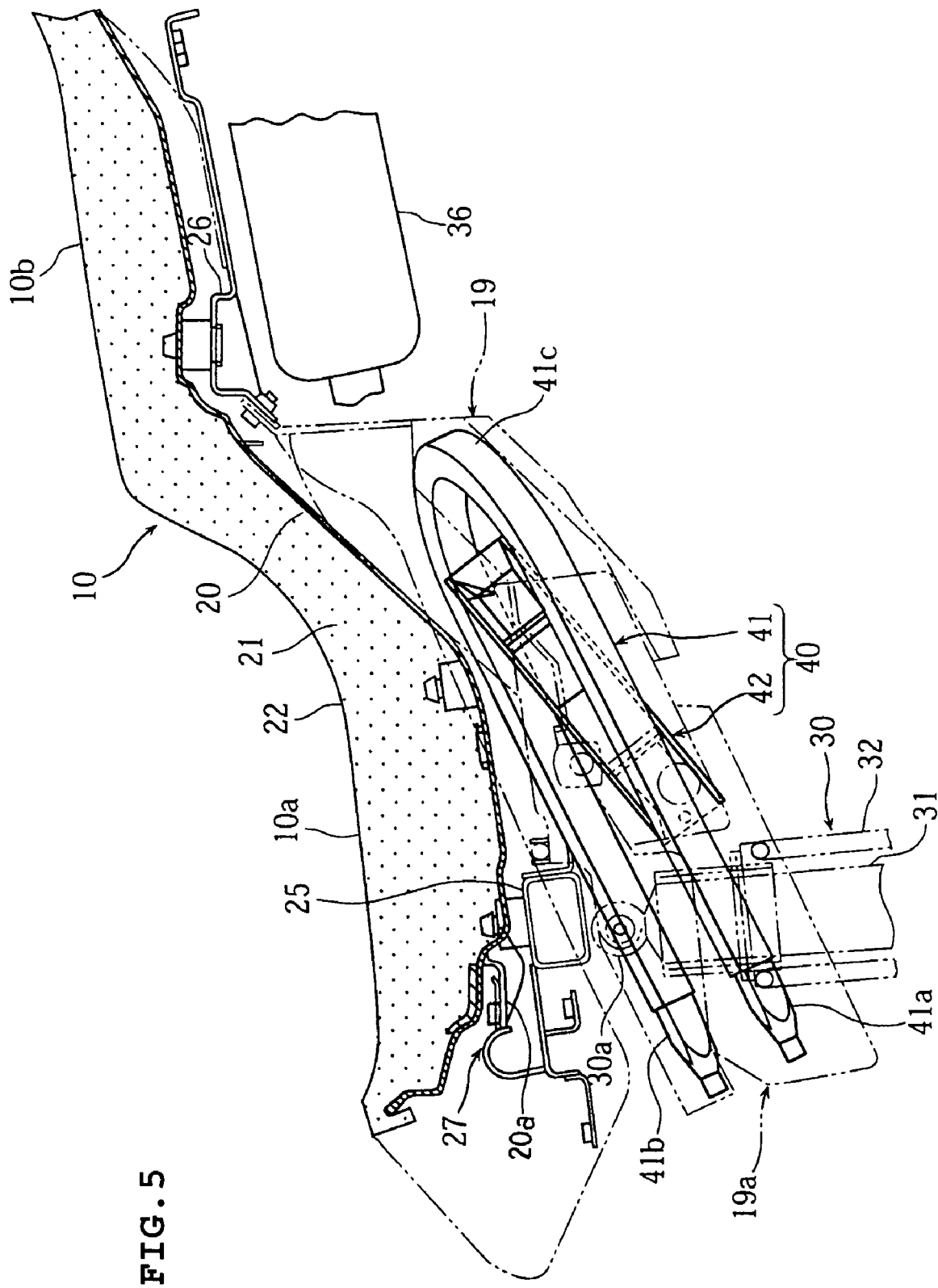
FIG. 5 is a side view of the housing structure for the locking device.
Figure 6:
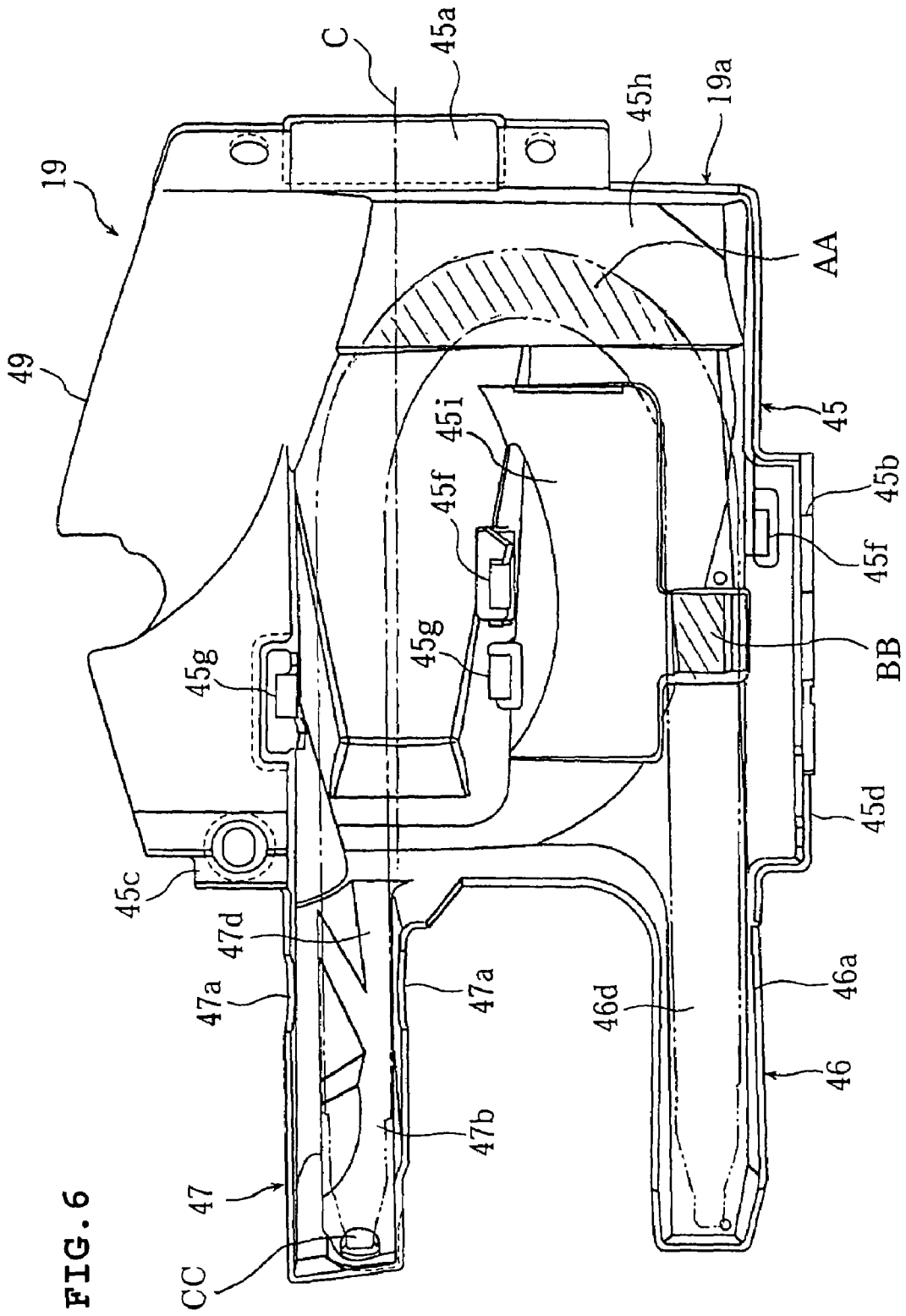
FIG. 6 is a plan view of a mud guard in which the locking device is housed.
Figure 7:
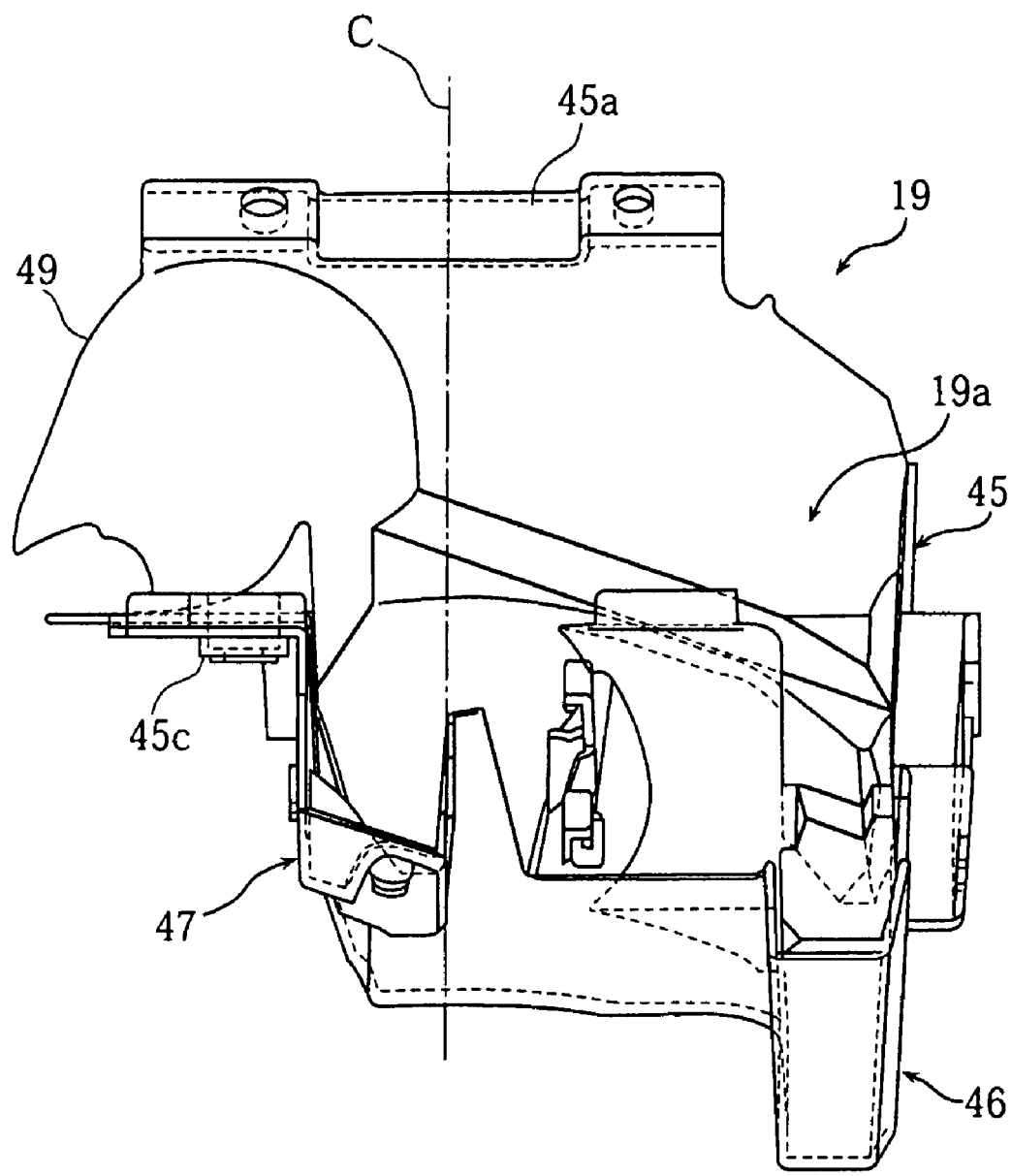
FIG. 7 is a front view of the mud guard.
Figure 8:
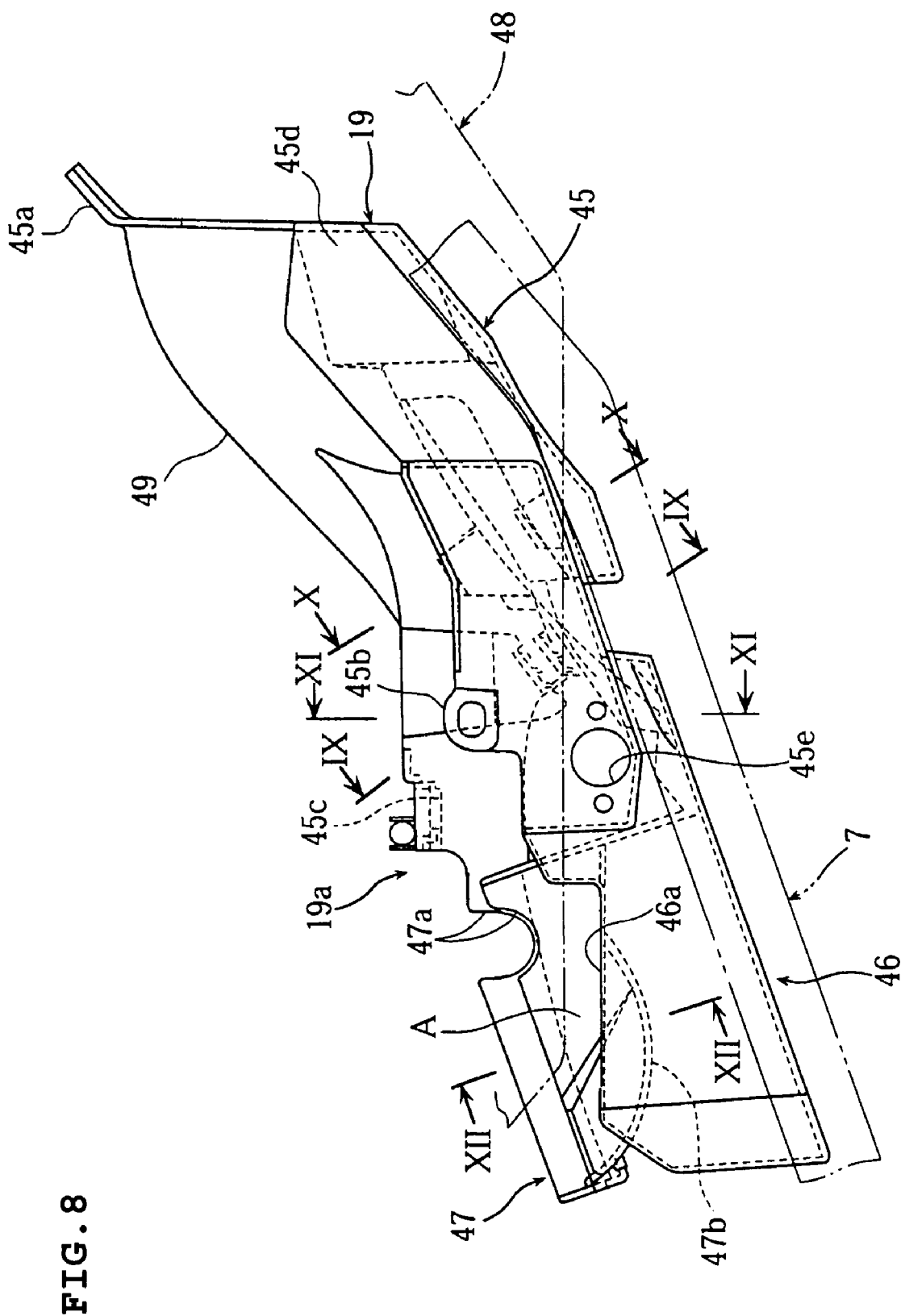
FIG. 8 is a side view of the mud guard.
Figure 9:
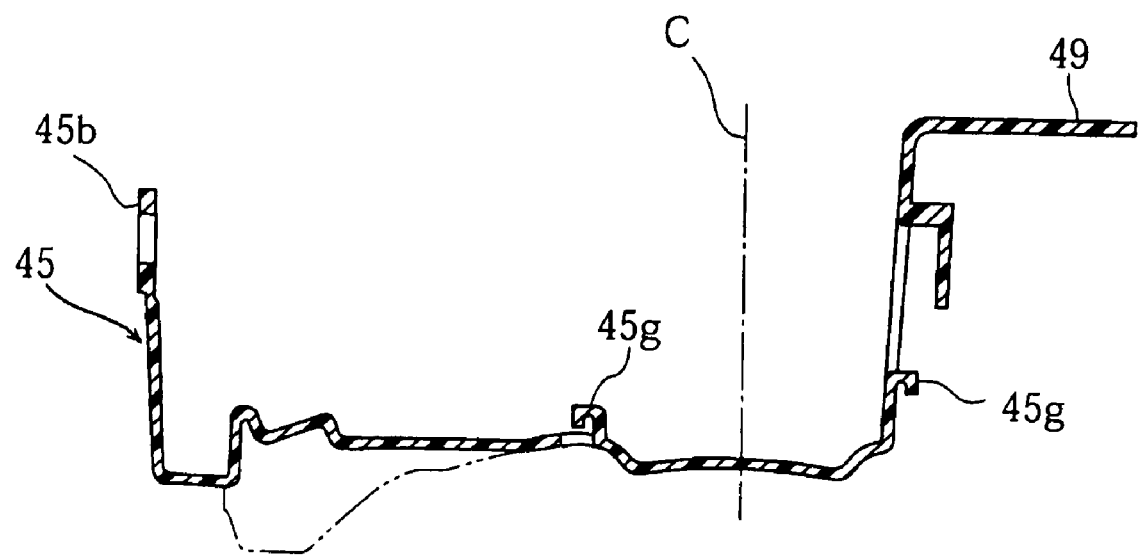
FIG. 9 is a sectional rear view of the mud guard (a sectional view along line IX-IX in FIG. 8).
Figure 10:
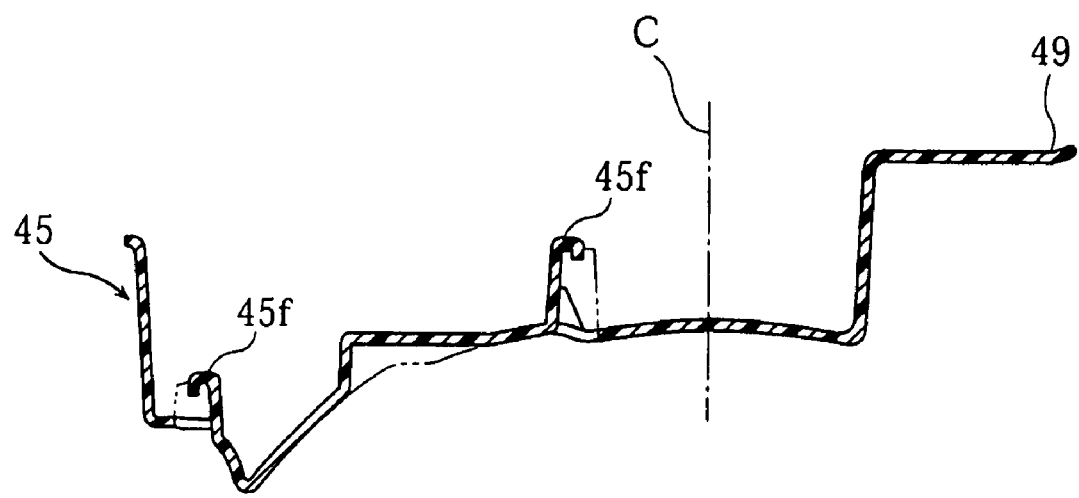
FIG. 10 is a sectional rear view of the mud guard (a sectional view along line X-X in FIG. 8).
Figure 11:
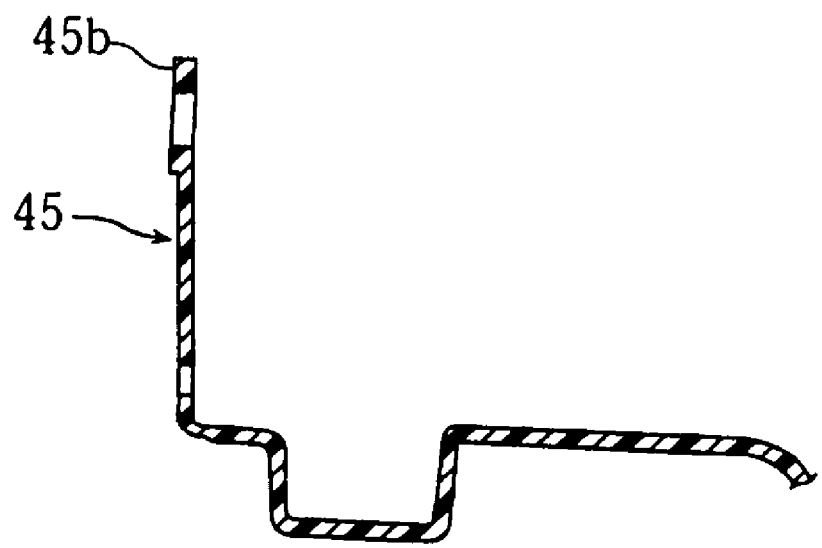
FIG. 11 is a sectional rear view of the mud guard (a sectional view along line XI-XI in FIG. 8).
Figure 12:
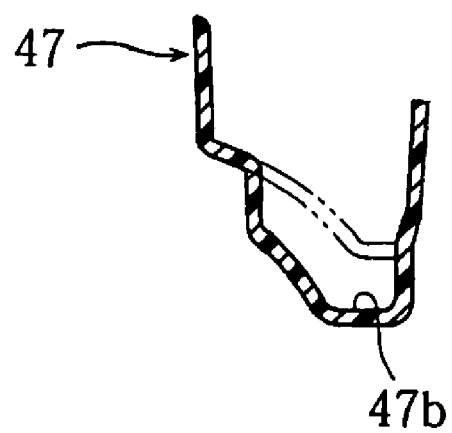
FIG. 12 is a sectional front view of the mud guard (a sectional view along line XII-XII in FIG. 8).

FIGS. 1 to 12 are diagrams for explaining a locking device housing structure for a motorcycle according to preferred embodiments of the invention. FIG. 1 is a side view of the motorcycle, FIGS. 2 and 3 are a plan view and a side view around the rear arms, FIGS. 4 and 5 are a plan view and a side view of the locking device housing structure, FIGS. 6, 7, and 8 are a plan view, a front view, and a side view of a mud guard, FIGS. 9 to 12 are sectional views along line IX-IX, line X-X, line XI-XI, and line XII-XII in FIG. 8, respectively. Note that the front and the rear and the left and the right referred to in the present preferred embodiment mean the front and the rear and the left and the right viewed from a rider in a position in which the rider sits on a seat.

In the figures, reference numeral 1 denotes a motorcycle. A body frame 2 of the motorcycle 1 has a schematic structure described below. Rear arm brackets 5, 5 extending downward substantially vertically are integral with rear ends of a pair of left and right tank rails 4, 4 extending obliquely downward to the rear of the vehicle from a not-shown head pipe. Left and right seat rails 6, 6 extending obliquely upward to the rear of the vehicle are bolted to a triangular bracket section 4a disposed at the rear ends of the left and right tank rails 4. Upper portions of the left and right rear arm brackets 5, 5 and the rear ends of the left and right seat rails 6, 6 are coupled by back stays 7, 7 slanting down and forward.

A four-cycle parallel four-cylinder engine 8 is mounted below the left and right tank rails 4 and a fuel tank 9 is mounted above the left and right tank rails 4. A seat 10 is mounted to the left and right seat rails 6, 6 behind the fuel tank 9. The seat has a front seat section 10a and a rear seat section 10b for a tandem rider located in a higher position than the front seat section 10a. The seat 10 has a structure in which a cushion member 21 is disposed in a bottom plate 20 and a surface of the cushion member 21 is covered with a skin 22.

A front fork 11 pivotally supported by a head pipe is disposed at a front end of the body frame 2. A steering handlebar 12 is fixed to an upper end of the front fork 11 and a front wheel 13 is pivotally supported at a lower end thereof.

Rear arms 14 are pivotally supported by the left and right rear arm brackets 5, 5 so as to vertically swing freely around a pivot shaft 15. A rear wheel 16 is axially supported at rear ends of the rear arms 14. Left and right rear arm sections 14a, 14a of the rear arms 14 are coupled by a cross member 17. An upper portion of the rear wheel 16 is covered with a rear fender 18. The rear fender 18 is attached and fixed to the rear arms 14 so as to be capable of moving vertically with the rear wheel 16. Note that reference sign 8a denotes a driving sprocket fastened to an output shaft 8b of the engine 8 and reference numeral 23 denotes a driven sprocket fastened to the rear wheel 16. Both the sprockets 8a and 23 are coupled by a chain 24 (see FIGS. 1 and 3).

A mud guard 19 preferably made of resin, for example, is disposed on a front side of the rear fender 18 in a front upper portion of the rear wheel 16. The mud guard 19 is preferably arranged to be mainly located below the front seat section 10a to prevent muddy water splashed by the rear wheel 16 from sticking to a bottom surface of the seat 10.

The left and right seat rails 6, 6 have a front section (a first portion) 6b located near a front end of the seat and a center section (a second portion) 6c located on a rear side of the front section 6b and having an interval in a vehicle width direction larger than that of the front section 6b. The front sections 6b, 6b are coupled by a substantially rectangular or cylindrical cross member 25. Rear sections 6d, 6d following the center section 6c are coupled by a cross member 26 made of sheet metal, for example. A hook section 20a at a front end of the seat 10 is inserted into a bracket 27 attached and fixed to the cross member 25 on the front side, whereby the seat 10 is supported by the bracket 27. A locking mechanism (not shown) for locking the seat 10 is attached to the cross member 26 at the rear portions. A key cylinder 28 (see FIG. 1) is coupled to this locking mechanism via a cable such that the lock of the seat 10 is released by performing a key operation.

A spring unit 30 is interposed between the cross member 25 on the front side of the seat rails 6 and the cross member 17 of the rear arms 14. An upper boss section 30a of the spring unit 30 is coupled to a bracket 25a fastened to a lower surface of the cross member 25 and a lower boss section 30b thereof is coupled to the cross member 17. This spring unit 30 has a structure in which a coil spring 32 is mounted on an outer periphery of a damper 31 and a spring characteristics adjusting mechanism (not shown) is arranged at an upper end of the damper 31.

The spring unit 30 is displaced to a left side in a vehicle width direction from a center line C and is arranged to be located between the pivot shaft 15, which pivotally supports the rear arms 14, and the front edge of the rear wheel 16 viewed from a side.

Four exhaust pipes 35 are connected to a not-shown exhaust port in a front wall of the engine 8. The respective exhaust pipes 35 extend downward from the exhaust port, then, extend below the engine 8 over to the rear of the engine 8, and merge into one merged pipe 35b at a merging section 35a. The merged pipe 35b extends upward along a rear side of the rear arm bracket 5 and through a space between left and right rear arm sections 14a, 14a of the rear arms 14. Moreover, the merged pipe 35b extends backward from a position near an upper end of the rear arm bracket along an inner side of the seat rail 6 on the right side. A muffler 36 is connected to a rear end of the merged pipe 35b. The muffler 36 is arranged on a lower side of the rear seat section 10b.

A locking device 40 for locking the front wheel 13 or the rear wheel 16 is housed in the body frame 2. The locking device includes a U-shaped lock arm 41 and a lock body 42 that closes a space between tips of left and right arm sections 41a and 41b of the lock arm 41. The lock arm 41 is mounted on a wheel and the lock body 42 is engaged with the left and right arm sections 41a and 41b, whereby the wheel is locked. The lock is released by inserting a key (not shown) into the lock body 42 and turning the key.

A housing section (a lock arm placing section) 19a for housing the lock arm 41 and the lock body 42 below the seat is integral with an upper surface of the mud guard 19. This housing section 19a includes a body section 45 having a substantially rectangular box shape, for example, opening upward with left and right legs 46 and 47 extending forward from the body section 45 so as to be located on left and right sides across an upper end of the spring unit 30.

An attachment flange 45a and attachment pieces 45b and 45c are provided at a rear edge and left and right outer edges of the body section 45, respectively. The attachment flange 45a is bolted to the cross member 26 at the rear portions. The attachment piece 45b on the left side and the attachment piece 45c on the right side are bolted to a back stay 7 and the cross member 25 on the front side, respectively, via a bracket and the like.

A cylinder mounting hole 45e for mounting the key cylinder 28 is provided in a left side wall section 45d of the body section 45. As shown in FIGS. 1 and 8, a portion of the left side wall section 45d including this cylinder mounting hole 45e is exposed to the outside from a space between a lower edge of a side cover 48, which is disposed to cover left and right lower sides of the seat 10, and an upper edge of the back stay 7. A pattern is provided by embossing the exposed portion.

A stepped section 46a is provided in a front side of the left side leg 46. A gap A is provided between the lower edge of the side cover 48 and the leg 46 by the stepped section 46a (see FIGS. 1 and 8). This gap A is located in a portion of the spring unit 30 facing the spring characteristics adjusting mechanism such that a tool or the like can be inserted from the gap A to adjust spring characteristics of the spring unit 30.

A shielding section 49 extends at a right edge of the body section 45. This shielding section 49 covers an inner side of a downstream end of the merged pipe 35b. A recess for performing work 47a is cut out in the right side leg 47. The recess for performing work 47a is located in a portion of the spring unit 30 facing the upper boss section 30a. Attachment, maintenance, or the like of the spring unit 30 can be performed in an assembly line by inserting a tool from this recess 47a.

Two sets of engagement hook sections, specifically, a pair of left and right engagement hook sections 45f, 45f and 45g, 45g are provided at a bottom of the body section 45. Fixing bands 50, 51 are laid over and engaged with the left and right engagement hooks 45f, 45f and 45g, 45g, whereby the lock arm 41 and the lock body 42 are fixed (see FIG. 4).

Viewed from the side of the vehicle, the housing section 19a extends forward as a whole and is slanted in the vehicle width direction such that the left side leg 46 is located in a position lower than the right side leg 47. An R-shaped relief recess 47b extending downward is provided at a bottom of the right side leg 47 (see FIGS. 8 and 12). This makes it possible to insert the lock arm 41 into the housing section 19a at an angle with respect to the housing section 19a.

In the body section 45, a bent placing section 45h, on which a bent section 41c of the lock arm 41 is placed and a body placing section 45i, on which the lock body 42 is placed, are provided. This body placing section 45i is provided in a section surrounded by the left and right arm sections 41a and 41b and the bent section 41c. Left and right arm placing sections 46d and 47d of a groove shape, on which the left and right arm sections 41a and 41b are placed, are provided in the left and right legs 46 and 47, respectively.

In order to house the locking device 40, a key is inserted into the key cylinder 28 to release the lock of the seat 10 and open the seat 10. The lock arm 41 is inserted down and forward from the rear of the seat 10 such that the left and right arm sections 41a and 41b thereof face forward, and the left and right arm sections 41a and 41b are placed on the arm placing sections 46d and 47d, respectively. At the same time, the bent section 41c is placed on the bent placing section 45h and the lock body 42 is placed on the body placing section 45i. Next, the fixing band 50 is laid over the left and right engagement hooks 45f, 45f, whereby the lock arm 41 and the lock body 42 are fixed. In addition, a tool T is placed on a lower side of the right lock arm 41b and a fixing band 51 is laid over the engagement hooks 45g, 45g, whereby the tool T is fixed.

Viewed in the housing position described above, as shown in FIG. 6, a tip of the right arm section 41b of the lock arm 41 engages with an engagement hole CC provided in the right leg 47. The left arm section 41a and the bent section 41c of the lock arm 41 are pressed by shaded sections BB and AA shown in the figure, respectively. Note that it is also possible that an engagement section CC' of a cap shape shown in FIG. 4 is provided instead of the engagement hole CC and the tip of the right arm section 41b is engaged with this engagement section CC'. The lock arm 41 is arranged toward the front-to-rear direction of the vehicle such that the left and right arm sections 41a and 41b are located on left and right sides across the spring unit 30 and is arranged to be slanted down and forward and slanted in the vehicle width direction such that the left arm section 41a is located in a position lower than the right arm section 41b. In addition, most of the lock arm 41 is arranged between the spring unit 30 and the muffler 36.

The left arm section 41a is arranged to project forward through a lower side between the front section 6b and the center section 6c of the seat rail 6. A front end of the left arm section 41a is located further on the outer side in the vehicle width direction than the front section 6b of the seat rail 6 and further on the inner side in the vehicle width direction than the center section 6c of the seat rail 6.

The lock body 42 is arranged in a section surrounded by the left and right arm sections 41a and 41b and the bent section 41c of the lock arm 41.

In this way, according to the housing structure in the present preferred embodiment, the lock arm 41 is arranged such that the left and right arm sections 41a and 41b thereof face the front-to-rear direction of the vehicle and is arranged such that the left and right arm sections 41a and 41b are located on the left and right sides across the spring unit 30. Thus, it is possible to house the lock arm 41 in a low position on the front side of the vehicle below the seat section 10a without interfering with the spring unit 30. This makes it possible to house the locking device 40 without increasing the height of the seat 10 and reducing the thickness of the seat cushion 21 and secure both the desired feet placing property and the seating comfort.

In the present preferred embodiment, the lock arm 41 is arranged to be slanted down and forward. Thus, it is possible to place and remove the lock arm 41 easily while preventing interference with the rear wheel 16. In addition, the left arm section 41a located on the displaced side of the spring unit 30 is slanted in the vehicle direction in a position lower than the right arm section 41b. Thus, it is possible to reduce a dimension in a vehicle width direction of the housing section 19a while avoiding interference with the spring unit 30.

In the present preferred embodiment, the lock body 42 is arranged between the left and right arm sections 41a and 41b and the bent section 41c of the lock arm 41. Thus, it is possible to house the lock body 42 using the free space between the left and right arm sections 41a and 41b effectively.

In the present preferred embodiment, the housing section 19a for housing the lock arm 41 and the lock body 42 is provided on the upper surface of the mud guard 19 disposed in front and above the rear wheel 16. Thus, it is possible to provide the housing section 19a using the existing mud guard 19 effectively and prevent an increase in the number of components compared with the case in which a housing section is provided separately.

The stepped portion 46a is provided in the left side leg 46 of the housing section 19a, whereby the gap A for adjusting the spring characteristics adjusting mechanism of the spring unit 30 is provided between the left side leg 46 and the lower edge of the side cover 48. Thus, it is possible to perform adjustment work for spring characteristics easily without removing components.

In the present preferred embodiment, the muffler 36 is arranged on the lower side of the rear seat section 10b and the lock arm 41 is arranged between the muffler 36 and the spring unit 30. Thus, it is possible to secure a housing space for housing the lock arm 41 in a so-called up-muffler type motorcycle. In addition, it is possible to avoid thermal damage from the muffler 36. As a result, it is possible to realize both the desired feet placing property and the seating comfort.

The shielding section 49 for shielding exhaust heat from the muffler 36 is integral with the housing section 19a. Thus, it is possible to avoid thermal damage from the exhaust pipe 35 surely without increasing the number of components.

The lock arm 41 and the muffler 36 are arranged side by side lengthwise below the seat and never overlap each other. Thus, it is impossible that a seat height increases to deteriorate the feet placing property or the thickness of the seat cushion decreases to deteriorate the seating comfort. Thus, it is possible to realize both the feet placing property and the seating comfort. In addition, since the lock arm 41 and the muffler 36 are arranged side by side lengthwise, it is possible to secure space for the muffler without increasing a vehicle width. Moreover, the muffler is located behind the lock arm placing section. Thus, in providing a structure for exhausting exhaust gas, it is unnecessary to take into account interference with the lock arm placing section. Therefore, it is possible to simplify the structure for exhausting exhaust gas while adopting the structure in which the lock arm 41 and the muffler 36 are arranged side by side lengthwise.

In the present preferred embodiment, the lock arm 41 is arranged on the lower side of the cross member 25 that couples the left and right seat rails 6, 6. Thus, it is possible to arrange the lock arm 41 using a space, which is provided in order to support the upper end of the spring unit 30, effectively. Moreover, the lock arm 41 is arranged such that the left arm section 41a passes below a space between the front section 6b and the center section 6c of the seat rail 6. Thus, it is possible to house the lock arm 41 without increasing the width of the front section 6b and secure the feet placing property. Note that, although the left arm section 41a is located further on the outer side than the front section 6b of the seat rail 6, the feet placing property is affected less because the left arm section 41a is arranged in a low position.

Note that, in the preferred embodiment described above, the lock arm 41 is housed such that the left and right arm sections 41a and 41b are located on the left and right sides of the spring unit 30. However, in the present invention, a lock arm may be housed such that left and right arm sections are located in the front and the rear of a spring unit in a vehicle, that is, such that the lock arm can be placed and removed in a vehicle width direction.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A motorcycle comprising:
a body frame;
a supporting shaft;
a rear arm having first and second ends, the first end arranged to support a rear wheel and the second end pivotally supported by the body frame via the supporting shaft;
a spring unit arranged between the supporting shaft and the rear wheel; and
a lock arm placing section arranged to house a lock arm having left and right arm sections and a coupling section for theft prevention of the motorcycle; wherein
the lock arm placing section is arranged to house the lock arm in a position in which the left and right arm sections of the lock arm are located on both sides of the spring unit.

2. The motorcycle according to claim 1, wherein the lock arm placing section is arranged to house the lock arm in a position in which the left and right arm sections are located on both left and right sides of the spring unit in a motorcycle width direction and so as to extend in a front-to-rear direction of the motorcycle.

3. The motorcycle according to claim 1, wherein the lock arm placing section is arranged to house the lock arm in a position in which the lock arm is slanted down and forward in the front-to-rear direction of the motorcycle and one of the left and right arm sections is located in a position lower than the other.

4. The motorcycle according to claim 1, wherein the lock arm placing section is arranged to house a lock body for the lock arm between the spring unit and the coupling section of the lock arm.

5. The motorcycle according to claim 1, further comprising a mud guard disposed above the rear wheel, wherein the lock arm placing section is arranged on an upper surface of the mud guard.

6. The motorcycle according to claim 1, further comprising a muffler arranged on a lower side of a rear portion of a seat, wherein the lock arm placing section is arranged between the muffler and the spring unit.

7. The motorcycle according to claim 6, further comprising a shielding section arranged to shield heat from the muffler, the shielding section being integral with the lock arm placing section.

8. The motorcycle according to claim 1, further comprising a cross member coupling left and right seat rails, the seat rails arranged to the support a seat and the spring unit, wherein the lock arm placing section is arranged below the cross member and between the seat rails.

9. A motorcycle comprising:
a seat arranged above a rear wheel;
a muffler of an exhaust system arranged between the seat and the rear wheel; and
a lock arm placing section arranged to house a lock arm having left and right arm sections and a coupling section for theft prevention of the motorcycle; wherein
the lock arm placing section is arranged under the seat and in front of the muffler, and the lock arm placing section is arranged to house the lock arm in a position in which a rear end of the lock arm is located substantially at the same height as the muffler and a front end of the lock arm is located in a position lower than the muffler.

10. A motorcycle comprising:
a seat arranged above a rear wheel;
an exhaust system including a muffler and an exhaust pipe, the muffler arranged between the seat and the rear wheel; and
a lock arm placing section arranged to house a lock arm having left and right arm sections and a coupling section for theft prevention of the motorcycle; wherein
the lock arm placing section is arranged under the seat and in front of the muffler, and the lock arm placing section is arranged to house the lock arm in a position in which the lock arm is displaced to one side of a center line in a motorcycle width direction; and the exhaust pipe is substantially parallel to and side-by-side with the lock arm placing section in the motorcycle width direction, and a section of the exhaust pipe where the exhaust pipe and the lock arm placing section are substantially parallel is bent to an opposite side of the center line than the lock arm placing section.

11. The motorcycle according to claim 10, wherein a connecting section of the exhaust pipe and the muffler is displaced to one side of the center line.

12. A motorcycle comprising:

a pair of left and right seat rails supporting a seat, the seat rails having a first portion located near a front end of the seat and a second portion located further in the rear in a front-to-rear direction of the motorcycle than the first portion, a distance between the second portions in a motorcycle width direction being larger than a distance between the first portions in the motorcycle width direction; and a lock arm placing section arranged to house a lock arm having left and right arm sections and a coupling section for theft prevention of the motorcycle; wherein the lock arm placing section is arranged to house the lock arm in a position in which the left and right arm sections of the lock arm extend upward to the rear in the front-to-rear direction of the motorcycle, to locate the coupling section in the rear in the front-to-rear direction of the motorcycle, to locate one of the left and right arm sections below a space between the first portion and the second portion of the seat rails, and to locate a tip of the one arm section on an outer side of the first portion in the motorcycle width direction and on an inner side of the second portion in the motorcycle width direction.

13. The motorcycle according to claim 12, wherein the lock arm placing section is arranged to slant and house the lock arm such that the one arm section is located in a position lower than the other of the left and right arm sections.

* * * * *